United States Patent [19]
Nitz et al.

[11] Patent Number: 5,265,340
[45] Date of Patent: Nov. 30, 1993

[54] OSCILLATING SAW CONSTRUCTION TOOL

[75] Inventors: Joseph W. Nitz, Albany; Donald B. Gordon, El Sobrante, both of Calif.

[73] Assignee: EZ Cuts Co., Oakland, Calif.

[21] Appl. No.: 900,317

[22] Filed: Jun. 18, 1992

[51] Int. Cl.$^5$ ............................................. B29B 33/02
[52] U.S. Cl. ..................................... 30/166.3; 30/355
[58] Field of Search ...................... 30/166.3, 392, 355, 30/272.1, 277.4, 276, 357, 353, 388, 144, 351; 83/473, 485, 486, 489, 477.2, 835; D8/95, 64; D15/133; 606/176, 177, 178

[56] References Cited

U.S. PATENT DOCUMENTS

| | | | |
|---|---|---|---|
| 3,505,733 | 4/1970 | Holden | 30/166.3 |
| 3,605,537 | 9/1971 | Pickler | 83/485 |
| 3,763,563 | 10/1973 | Schultz | 30/166.3 |
| 3,802,472 | 4/1974 | Morse | 83/477.2 |
| 3,869,795 | 3/1975 | Treace | 30/355 |
| 4,013,107 | 3/1977 | Steiger et al. | 30/166.3 |
| 4,081,906 | 4/1978 | Sigler | 30/276 |
| 4,361,956 | 2/1982 | Kirk | 30/166.3 |
| 4,421,111 | 12/1983 | Rothman | 30/124 |
| 4,543,718 | 10/1985 | Duescher | 30/124 |
| 4,615,119 | 10/1986 | Johnson et al. | 30/357 |
| 4,625,405 | 12/1986 | Hudnutt et al. | 30/370 |
| 4,993,502 | 4/1991 | McCullough | 30/276 |

FOREIGN PATENT DOCUMENTS

| | | | |
|---|---|---|---|
| 3906643 | 9/1990 | Fed. Rep. of Germany | 30/166.3 |
| 0186519 | 10/1983 | Japan | 30/166.3 |

OTHER PUBLICATIONS

"The American Orthopaedic Cast Cutter" by American Orthopaedic Inc. 36270 West 103rd Street, DeSoto, Kansas 66018.

"Hot Wire Scroll Saw" from Scientific American, Oct., 1937, p. 248.

Primary Examiner—Richard K. Seidel
Assistant Examiner—Hwei-Siu Payer
Attorney, Agent, or Firm—Howard Cohen

[57] ABSTRACT

An oscillating blade saw used for cutting a wide range of construction materials, vehicular materials, and general structural materials. The saw is inherently safer than prior art cutting tools such as circular saws, jig saws, band saws, and the like, while being effective in cutting many materials that are cut by prior art power saws. The oscillating blade saw of the present invention comprises an electrical motor coupled to one end of a drive shaft, the motor being powered by either AC utility power or self-contained, rechargeable batteries. An output shaft is mounted in the distal end of the tool, and includes a cam follower impinging on a cam mounted on the drive shaft. The cam and follower are dimensioned so that the output shaft oscillates through an angular excursion of a few degrees or less. A disc-like saw blade is mounted on the output shaft, the blade having non-direction saw teeth extending from the edge thereof. The blade may be circular, trianguloid, ellipsoid, or the like, depending upon the nature and purpose of the cut to be made. The blade disc may be hardened to cut dense and tough materials. The tool may be fashioned as a hand-held device, with a tubular neck extending from the motor housing to enclose the drive shaft and provide a handle for grasping, or may comprise a table saw, or a radial arm saw. Alternatively, the output shaft and cam assembly may be driven through a flexible cable shaft by a stationary motor to provide enhanced maneuverability and flexibility in use.

4 Claims, 5 Drawing Sheets

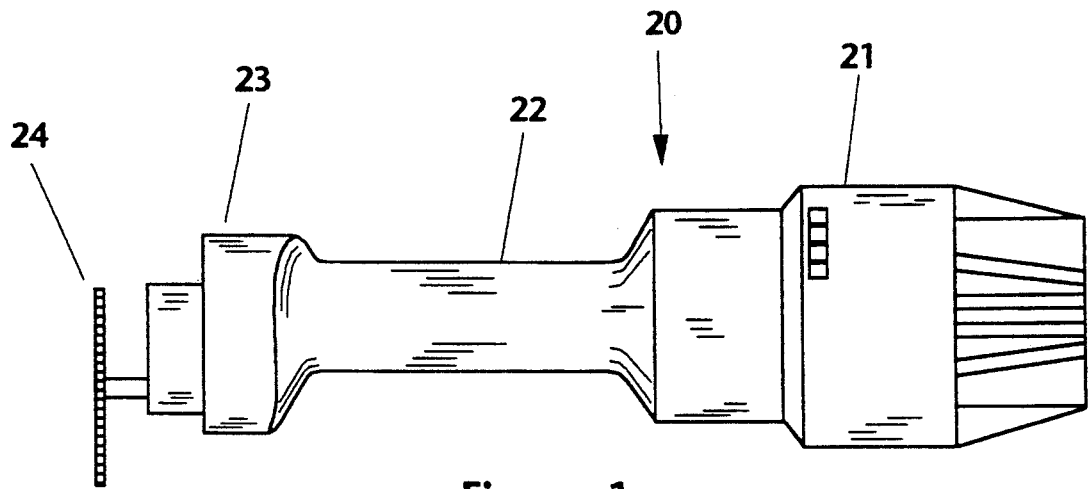
Figure_1
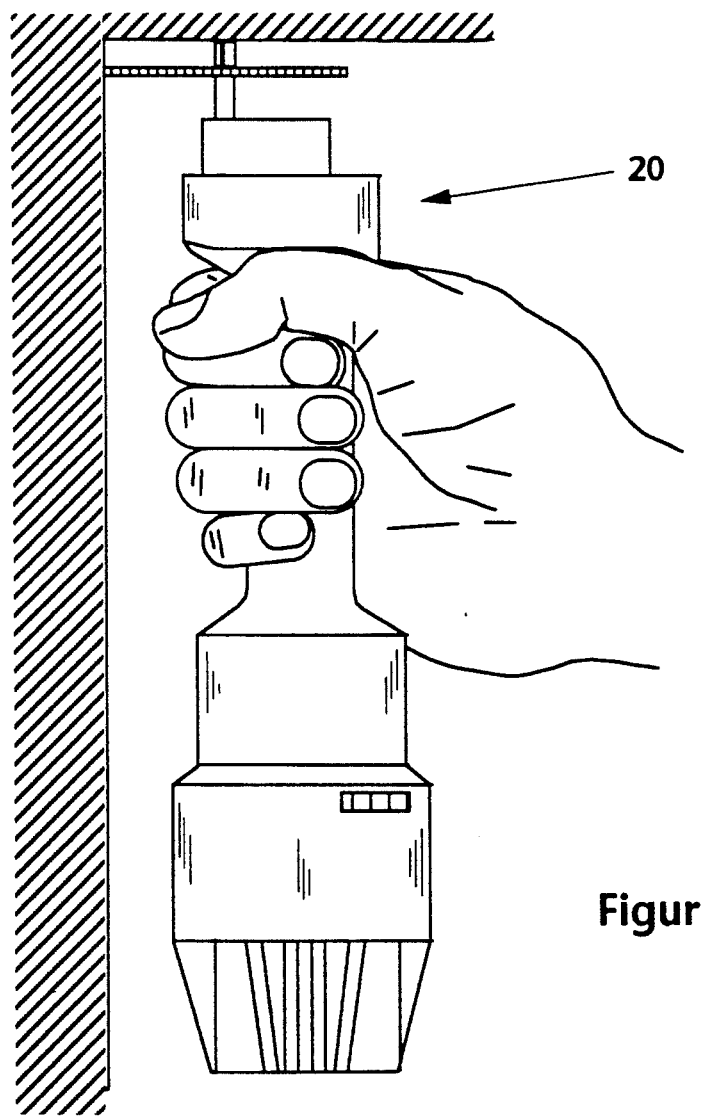
Figure_2

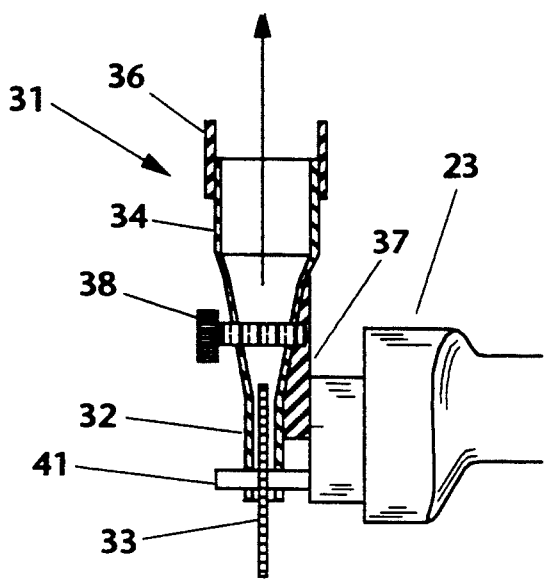
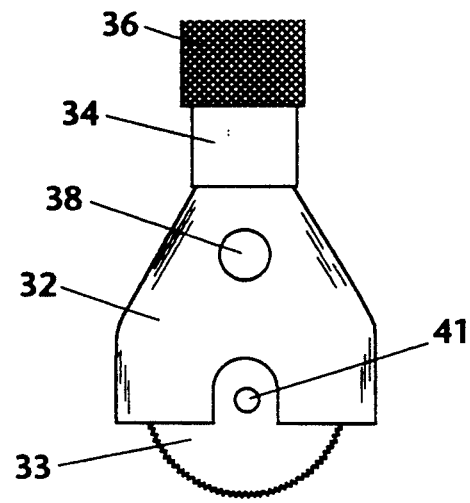
Figure_3    Figure_4
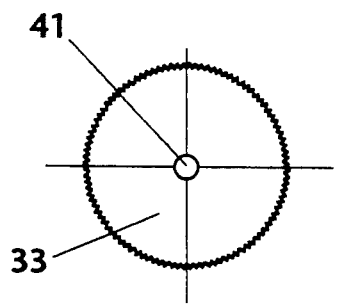
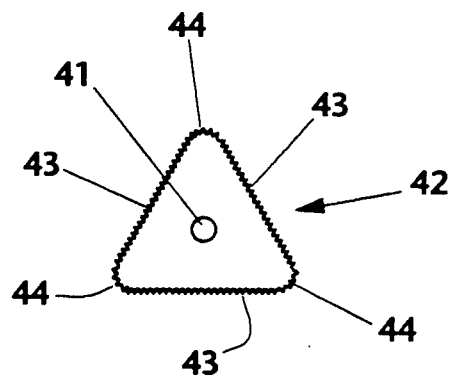
Figure_5    Figure_6
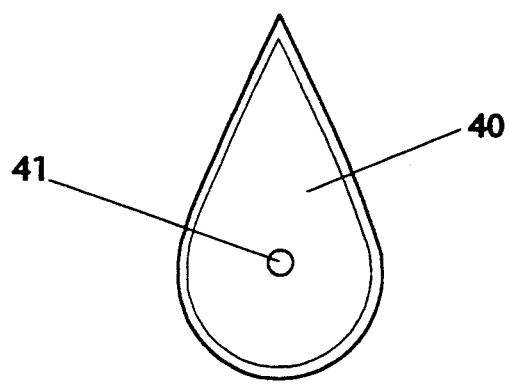
Figure_7

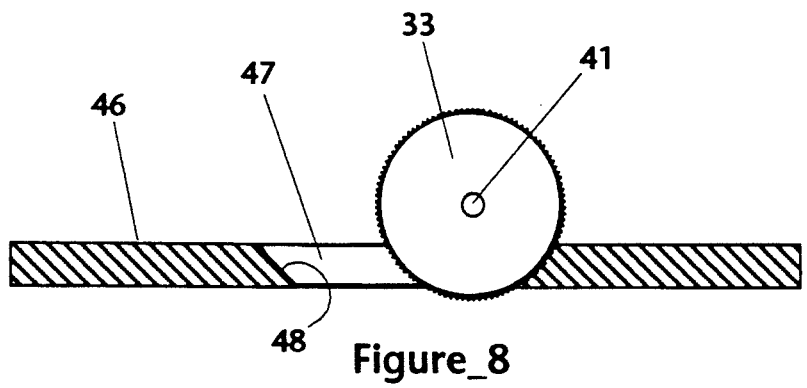
Figure_8
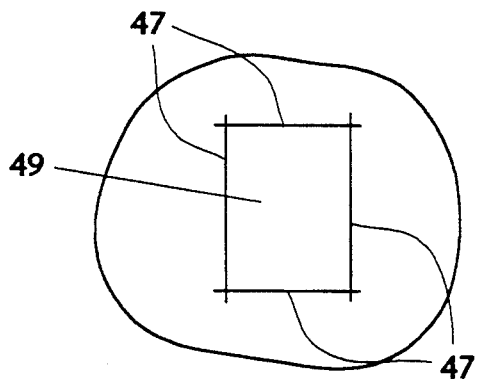
Figure_9
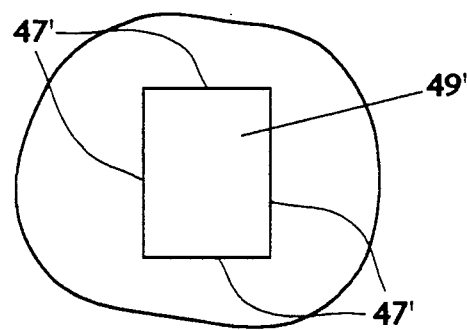
Figure_11
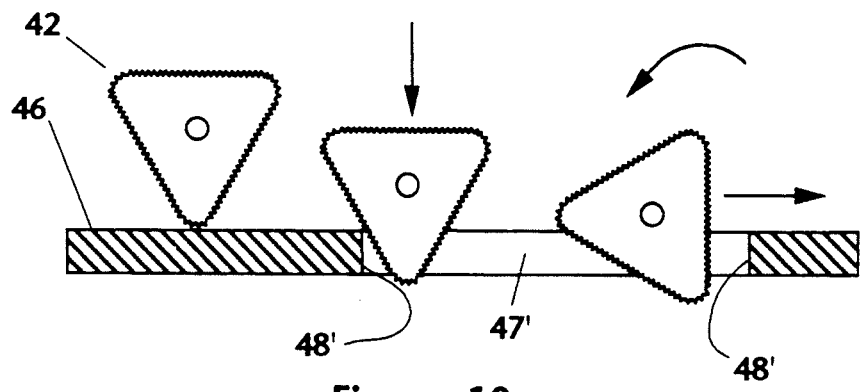
Figure_10

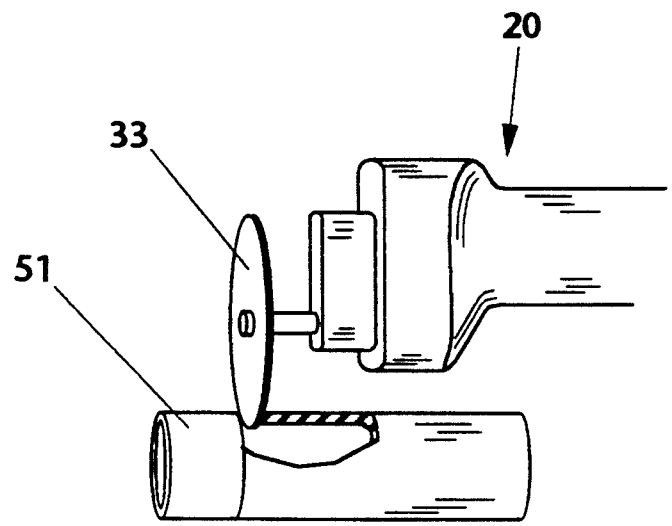
Figure_12
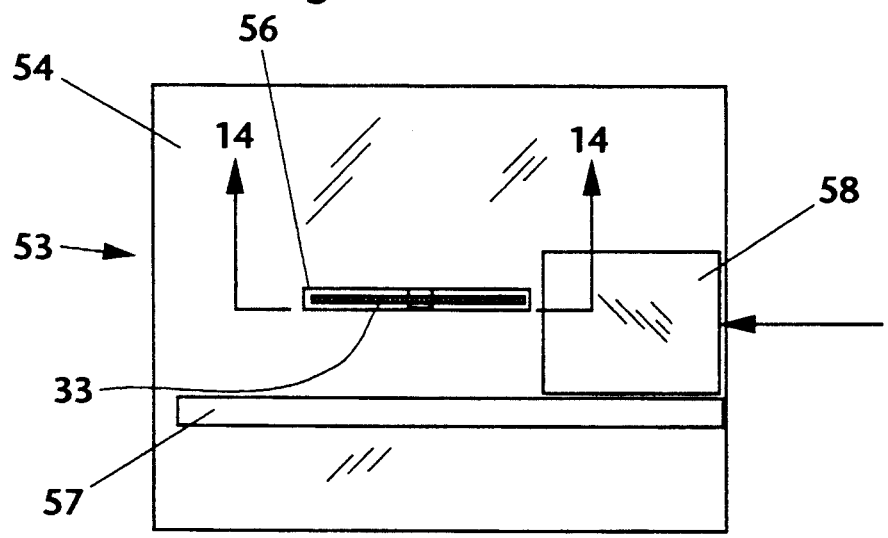
Figure_13
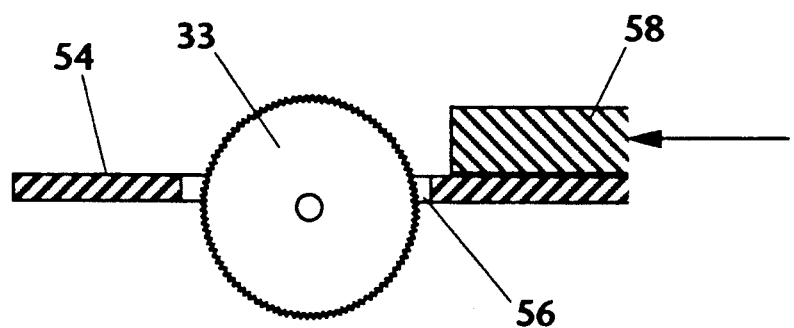
Figure_14

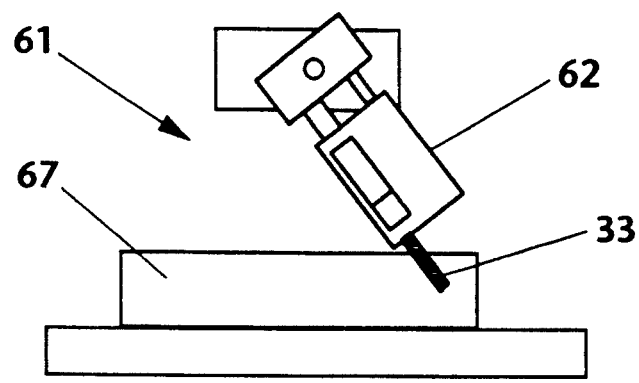
Figure_15
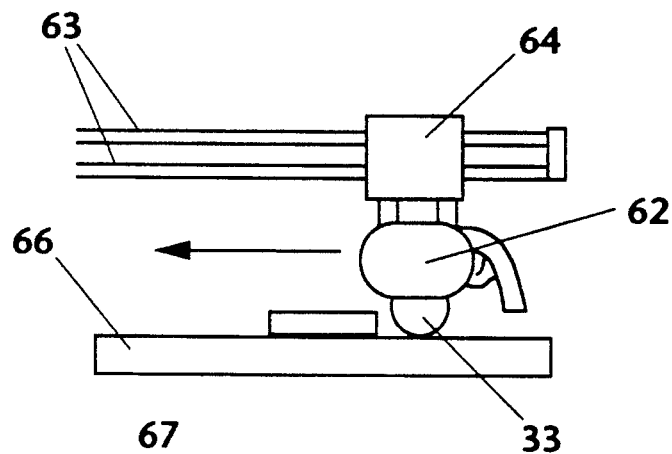
Figure_16
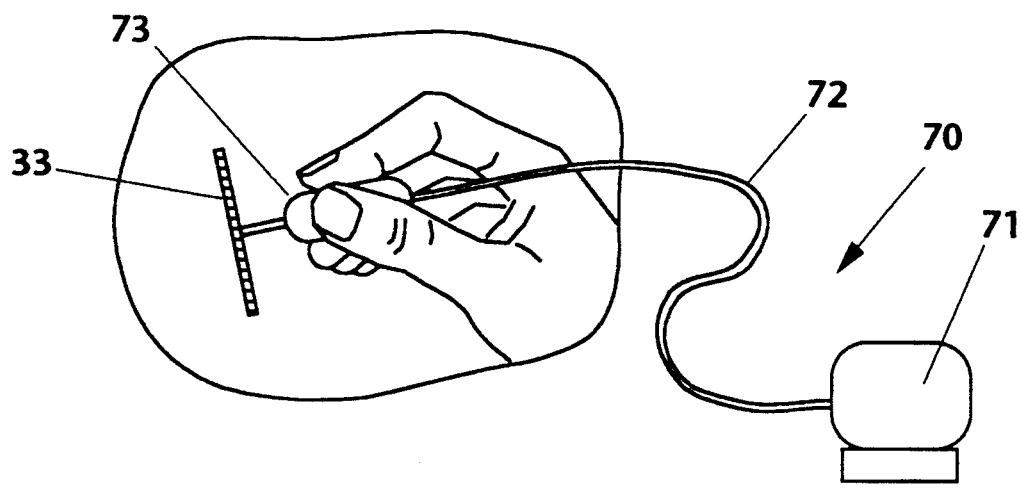
Figure_17

OSCILLATING SAW CONSTRUCTION TOOL

BACKGROUND OF THE INVENTION

The field of the invention is construction tools, and more specifically an oscillating saw used for general construction, repair, installation, and cutting of various materials for these and other purposes.

Oscillating saws are known in the prior art to comprise a circular blade having fine pitch teeth and an oscillating motor drive to drive the blade reciprocally through an angular excursion of a few degrees or less. These devices are generally used for medical purposes such as cutting plaster casts to effect removal thereof from a limb or body portion. Oscillating saws are also used to cut bone; e.g., to sever the sternum and create an entry opening for cardiac bypass surgery and other open heart procedures. The primary reason oscillating saws are used for such medical purposes is that the oscillating blade is effective in cutting hard or rigid tissue such as bone, but not soft or slack material such as skin or membrane. Therefor, for the types of procedures noted above the oscillating saw minimizes the danger of accidental incision to the patient while cutting the intended material.

In other fields such as construction, manufacturing, repair, and installation of appliances and mechanical systems and the like, cutting tools such as circular saws, jig saws, band saws, chain saws, and the like are well known in the prior art. These power tools are considered to be sufficient for their intended purposes, although they all have their drawbacks. For example, all power tools are dangerous to the individuals operating them, and the accident rate for users of power tools is quite high in the building and construction trades as well as among domestic users. Such accidents can be catastrophic, including loss of limbs, loss of eyesight, and loss of life. Although safety devices and safety procedures have been devised for most power tools, such as blade guards, use of protective eye wear, electrically grounded housings, and benches for supporting workpieces, severe accidents continue to occur.

Furthermore, all power cutting tools may tend to pull the workpiece through the cutting blade, due to the rotational motion or reciprocating motion of the blade. This action can limit the ability of the worker to control the speed of the cut. Also, the blade may bind in the cut, in which case the motion of the blade may be transmitted directly to the workpiece, causing the workpiece to fly off or causing the tool to lurch out of the grasp of the worker. In either case there is great danger to the worker and surrounding personnel.

Therefor, it is an object of the invention to apply the inherently safer oscillating blade cutting device to fields such as construction, manufacturing, repair, and installation of appliances and mechanical systems and the like. It is a further object of the invention to provide an improved oscillating blade saw that is optimized for a wide range of uses and for a wide range of materials.

SUMMARY OF THE INVENTION

The present invention generally comprises an oscillating blade saw used for cutting a wide range of construction materials, vehicular materials, and general structural materials. The saw is inherently safer than prior art cutting tools such as circular saws, jig saws, band saws, and the like, while being effective in cutting many materials that are cut by prior art power saws. For example, the oscillating blade saw may be used for cutting wood or plastic paneling, sheet rock and wall board, plywood, glass board, linoleum and other floor coverings, Formica, wood or composition shingles, Lexan, Plexiglas, polycarbonate, and other plastic or resin materials, acoustic tile, light diffusers, aluminum gutters and flashing, PVC or ABS pipe, fittings, and gutters, expanded foam insulation and articles, pipe insulation, stucco, tile grout, copper pipe, and similar materials.

In home construction and home repair, the tool may be used for window installation, roof installation and repair, plumbing installation and repair (including cutting pipe and fittings as well as cutting wall openings), insulation installation, dry rot removal, tile repair, flooring installation and repair, sheet rock installation, electrical wiring installation, plumbing installation and repair, and the like. In vehicle construction and retrofitting, the tool may also be used for cutting openings in ceiling, door, dashboard, floor, and other interior panel assemblies for retrofitting, customizing, and modifying vehicles.

A salient feature of the oscillating blade saw is that it may be used to form an opening in a surface by direct action, without first drilling a hole through the surface to permit access for the saw blade. Thus, for example, a hole in a sheet rock wall for a standard electrical junction box may be formed by making four cuts directly into the wall, with no entry hole, to define the sides of the rectangular hole, and then removing the cutout portion. Moreover, the invention provides non-circular blades having at least one straight edge, so that the cuts defining the cutout intersect without overlapping.

Another salient feature of the invention is that the oscillating blade saw is inherently safer than prior art power saws that employ rotating or reciprocating blades. The oscillating saw blade is driven through a small angle, in the range of a few degrees or less, and oscillates at a high frequency of many cycles per second. As a result, the blade cuts rigid, non-yielding materials such as common construction and manufacturing materials, but does not readily cut soft, slack, yielding materials such as skin, textile fabric, or the like. Thus the danger to workers is greatly reduced over prior art power tools.

A further advantage of the tool of the present invention lies in the fact that the blade oscillates through a very small angular excursion. As a result, the sawdust and debris resulting from the cutting action are not ejected from the blade at high velocity, as is the case in prior art power tools. The sawdust and debris are thus not broadcast widely from the cutting site, nor dispersed into the air, and are easily collected by conventional means such as vacuum action and the like.

The oscillating blade saw of the present invention comprises an electrical motor coupled to one end of a drive shaft, the motor being powered by either AC utility power or self-contained, rechargeable batteries. An output shaft is mounted in the distal end of the tool, and includes a cam follower impinging on a cam mounted on the drive shaft. The cam and follower are dimensioned so that the output shaft oscillates through an angular excursion of a few degrees or less. A disc-like saw blade is mounted on the output shaft, the blade having non-direction saw teeth extending from the edge thereof. The blade may be circular, trianguloid, ellipsoid, or the like, depending upon the nature and purpose of the cut to be made. The blade disc may be hardened to cut dense and tough materials. The tool may be fashioned as a hand-held device, a table saw, or a radial arm saw. Alternatively, the output shaft and cam assembly may be driven through a flexible cable shaft by a stationary motor to provide enhanced maneuverability and flexibility in use.

BRIEF DESCRIPTION OF THE DRAWING

FIG. 1 is a plan view of the hand-held embodiment of the oscillating blade saw of the present invention.

FIG. 2 is a perspective view showing the tool depicted in FIG. 1 in use.

FIG. 3 is a partially sectioned detail view of a vacuum attachment for the tool depicted in FIGS. 1 and 2 for removing sawdust and debris.

FIG. 4 is a plan view of the vacuum attachment depicted in FIG. 3.

FIG. 5 is a plan view of a circular saw blade of the present invention.

FIG. 6 is a plan view of a trianguloid saw blade of the present invention.

FIG. 7 is a plan view of a teardrop saw blade of the present invention.

FIG. 8 is a cross-sectional elevation showing a saw cut formed by a circular saw blade of the present invention.

FIG. 9 is a plan view of a wall cutout formed with a circular blade as shown in FIG. 8.

FIG. 10 is a cross-sectional elevation showing the sequence of steps for forming a wall cutout using the trianguloid blade of the present invention.

FIG. 11 is a plan view of the wall cutout formed using the trianguloid blade as shown in FIG. 10.

FIG. 12 is a perspective view showing the hand held embodiment of the invention used in cutting plastic or metal pipe.

FIG. 13 is a plan view showing a table saw embodiment of the oscillating blade saw of the present invention.

FIG. 14 is a cross-sectional elevation taken along line 14—14 of FIG. 13.

FIG. 15 is an end view of a radial arm saw embodiment of the oscillating blade saw of the present invention.

FIG. 16 is a side view of the radial arm saw embodiment depicted in FIG. 15.

FIG. 17 is a perspective view of a flexible cable drive embodiment of the oscillating blade saw of the present invention.

DESCRIPTION OF THE PREFERRED EMBODIMENTS

The present invention generally comprises an oscillating blade power saw tool adapted for new uses in cutting construction materials, structural materials, and the like. With regard to FIGS. 1 and 2, one embodiment 20 of the tool intended for hand held use includes a generally cylindrical motor housing 21 and a tubular neck portion 22 extending therefrom in general axial alignment. An oscillating drive housing 23 is joined to the distal end of the neck portion 22, and an oscillating blade assembly 24 extends distally from the drive housing 23. These general features are known in the prior art medical tools. In the present invention the neck portion is sufficiently small in diameter to be grasped and sufficient in length to accommodate an average hand span, as shown in FIG. 2, so that the tool may be wielded by being grasped by a hand clenched about the neck 22.

Although oscillating blade saws are known in the prior art as medical devices used as cast cutters and bone saws, the present invention encompasses the use of oscillating blade saws to cut construction materials and the like. For example, the oscillating blade saw may be used for cutting wood or plastic paneling, sheet rock and wall board, plywood, glass board, linoleum and other floor coverings, Formica, wood or composition shingles, Lexan, Plexiglas, polycarbonate, and other plastic or resin materials, acoustic tile, light diffusers, aluminum gutters and flashing, PVC or ABS pipe, fittings, and gutters, expanded foam insulation and articles, pipe insulation, stucco, tile grout, copper pipe, and similar materials.

In home construction and home repair, the tool 20 may be used for window installation, roof installation and repair, plumbing installation and repair (including cutting pipe and fittings as well as cutting wall openings), insulation installation, dry rot removal, tile repair, flooring installation and repair, sheet rock installation, electrical wiring installation, plumbing installation and repair, and the like. In vehicle construction and retrofitting, the tool 20 may also be used for cutting openings in ceiling, door, dashboard, floor, and other interior panel assemblies for retrofitting, customizing, and modifying vehicles. As shown in FIG. 2, the tool 20 is capable of cutting within small clearances in restricted spaces, due to the fact that the tool is compact in design and no blade guard is required.

A distinct advantage of the tool of the present invention lies in the fact that the blade oscillates through a very small angular excursion. As one result, the sawdust and debris resulting from the cutting action are not ejected from the blade at high velocity, as is the case in prior art power tools. The sawdust and debris are thus not broadcast widely from the cutting site, nor dispersed into the air, and pose far less hazard to the vision and respiration of the tool operator.

Moreover, the dust and debris are easily collected by conventional means such as a vacuum attachment 31, as shown in FIGS. 3 and 4. The attachment 31 includes a housing 32 dimensioned to encompass approximately half of the blade 33 of the tool 20. The housing 32 tapers away from the blade to join a tubular fitting 34 that is dimensioned to receive a hose 36 from a vacuum (low pressure) source. A mounting bracket 37 is secured to the housing portion 23 of the tool by screws or the like (not shown), and a thumb screw 38 extends through the housing 32 to a threaded hole in the bracket 37 to removably secure the vacuum attachment to the tool. Low pressure is applied to the attachment 31 through the hose 36 to remove sawdust and particulate debris by vacuum induction.

Another advantage of the oscillating saw used in construction and assembly and repair tasks is that it may form precise cuts and openings, due to the fact that the oscillating blade has no net tangential velocity and does not skip from the workpiece nor pull or push with respect to the workpiece. Thus the depth, velocity, and extent of the cut depends only on the magnitude, direction, and duration of the manual pressure used to urge the oscillating blade into the workpiece. These characteristics are in direct contrast to circular saws known in the prior art for construction purposes, in which the high velocity blade ejects dust and debris at high velocity, and the blade rotation promotes the progress of the cut. in contrast to circular saws and reciprocating saws known in the prior art, the oscillating saw of the invention may be stopped and restarted in the midst of a cut without danger, whereas prior art power tools can be extremely hazardous when the blade is lodged in a cut and the tool is started.

With regard to FIG. 5, the blade 33 comprises a circular disc having fine pitch, non-directional teeth formed at the peripheral edge thereof. The output shaft 41 of the tool extends through the center of the disc. It may be appreciated that only a portion of the teeth of the blade contact the workpiece at any time, due to the fact that the blade does not rotate. Thus, when the used portion of the teeth become worn, the blade may be loosened, rotated approximately 180°, and resecured to the output shaft 41 to expose unused blade teeth to the workpiece.

As shown in FIG. 8, a circular blade 33 may be used to form a saw cut 47 in an object 46 such as sheet rock, paneling, or the like. The tool is held so that the blade disc intersects the surface of the object, and the blade is urged directly into the object. After the cut is initiated, the tool may be urged parallel to the surface of the object 46 to extend the cut. A salient aspect of the cutting process is that the oscillating blade does not pull or buck or in any way move the tool with respect to the workpiece. Thus precise cuts may be formed without difficulty.

A circular blade creates a sloping entry 48, as shown in FIG. 8. A series of cuts 47 may be combined to create an opening, such as the rectangular opening 49 shown in FIG. 9. For example, the opening 49 may comprise an access hole in a wall for plumbing installation, an opening to receive an electrical junction box, switch box installation, or lighting fixture, or the like. However, due to the fact that the direct entry cut using a circular blade includes the sloping edge 48, the cuts 47 must overlap at the corners in order to intersect completely and permit the cutout portion to be removed. If the object installed in the opening 49 does not have a flange or outer edge to cover the overlapped cuts, the exposed overlapping cuts may be esthetically unacceptable. Furthermore, the overlapped cuts at the corners of the opening 49 in materials such as plaster, sheet rock, and the like may encourage the formation of cracks radiating therefrom.

The invention includes a blade construction that overcomes the problem of overlapping cuts in the formation of an opening 49. As shown in FIG. 6, a trianguloid blade 42 includes three linear edges 43 in triangular relationship, and smoothly radiused edge intersections 44. The continuous edge includes fine pitch, non-directional teeth, and the shaft 41 extends through the centroid of the triangular edges 43. It should be noted that the blade oscillates but does not rotate, so that the use of a triangular or other non-circular configuration poses no problems regarding balance or vibration.

With regard to FIG. 10, a radiused end of the oscillating blade 42 may be urged directly into the object 46 to initiate a cut 47'. Thereafter, the tool is urged parallel to the surface of the object 46 to extend the cut 47'. The tool may be rotated so that one of the linear edges 43 forms the leading edge 48' of the cut 47', and that leading edge 48' is generally perpendicular to the surface of the object 46. Likewise, the initial edge of the cut 47' may be modified to be perpendicular, merely be rotating the tool so that an edge 43 of the blade rectifies the initial opening. As a result, a series of cuts 47' may be combined to form a cutout opening 49' in which the ends of the cuts 47' intersect to form perfect vertices with no overlap. This result is not attainable with a standard circular saw power tool.

As shown in FIG. 12, the tool 20 of the invention may be used advantageously to cut plastic or copper pipe 51 or the like. The saw blade 33 (or 42) cuts directly into the pipe without any skipping or lateral thrust, due to the fact that the blade oscillates but has no net tangential velocity. Thus pipe or any arcuate object may be cut precisely and easily at any angular relationship to the surface or orientation to the axis of the object. The tool 20 is also ideal for use in building repair work such as removing and replacing dry rot in wood construction, cutting stucco material for repair or installation purposes, and cutting tile grout from a tile array to remove and replace existing tiles. For harder and tougher materials, the blade 33 or 42 or the like may be strengthened by case hardening, carburizing, or the like.

Another excellent use for the tool 20 is in cutting and shaping expanded foam plastic such as styrene and Styrofoam to create packing members for shipping, or forms for casting materials such as plastic resin, plaster, and concrete. The tool is also ideal for cutting plastic panel materials, such as polycarbonate, methacrylates, polystyrene, polyethylene, and the like. In this regard, it should be noted that many passenger vehicles are furnished with interior panels fabricated of these or similar plastic materials, and retrofit installations that involve cutting openings in the interior panels are ideally carried out with the apparatus of the invention.

A further exemplary use of the invention is in the repair or renovation of existing plaster walls, Plaster walls are known to develop cracks due to settling of a building, seismic activity, and the like, and to sustain water damage and the like. In the prior art it is commonplace to cut into plaster walls using a reciprocating linear blade saw introduced into the wall through a drilled access hole. Although the reciprocating blade cuts plaster easily, the blade can grab the lathe and the gross motion of the blade can cause severe cracking and damage to the plaster wall. In contrast to these problems, the oscillating saw blade moves in sufficiently small increments that it cannot damage the plaster, while it cuts the material as effectively as the linear reciprocating blade.

A further embodiment of a blade for the apparatus, shown in FIG. 7, comprises a planar member 40 having a teardrop configuration and a peripheral edge that is sharpened to a knife edge. The teardrop configuration provides a point for forming a small entry hole, a broad arcuate edge for large cuts, and a linear edge portion for forming intersecting cuts that do not overlap. The knife edge is preferred for softer materials such as sheet rock or expanded foam. Other oscillating blade configurations, having a knife edge or having teeth at the peripheral edge, are within the scope of the invention.

The invention also encompasses an oscillating blade table saw 53, shown in FIGS. 13 and 14. A table platform 54 includes a slot 56 formed therein and dimensioned to permit an oscillating blade 33 (or 42) to extend therethrough. A guide 57 is secured to the platform 54 parallel to the slot 56 so that a workpiece 58 may be translated past the blade to effect a cut therein. An oscillating drive system (not shown) and a vacuum debris removal system (not shown) are provided. A major advantage of the table saw 53 over similar prior art devices is that it is far more safe, due to the fact that the blade 33 oscillates but does not rotate, and is much less capable of cutting flesh.

A further embodiment of the invention, depicted in FIGS. 15 and 16, comprises a radial arm saw 61 incorporating an oscillating blade 33 (or 42, or the like). A housing 62 encloses a motor drive and oscillating drive system for the blade 33, and a support bracket 64 engages a longitudinally extending arm assembly 63. The bracket 64 provides means for adjusting the angle of the housing with respect to a table platform 66, so that the angle of the blade with respect to the workpiece 67 may be precisely controlled. This arrangement provides the advantages of prior art radial arm saws while also providing increased safety for the operator.

Another embodiment of the invention, shown in FIG. 17, comprises a flexible cable drive oscillating blade tool 70. The tool 70 includes an electrical motor drive assembly 71 coupled to a flexible, rotating cable drive 72. The distal end of the cable drive 72 is joined to a housing 73 which encloses an oscillating drive. The blade 33 is joined to the oscillating drive through an output shaft 41. The flexible cable permits use of the blade 33 to cut materials in locations and orientations that would otherwise be inaccessible with a larger tool 20 or the like. The small housing 73 is dimensioned to be grasped and manipulated in the manner of a pencil, and this feature enhances the intrinsic ability of the oscillating blade to form precise cuts, particularly due to the fact that the oscillating blade has no net tangential velocity and does not skip from the workpiece nor pull or push with respect to the workpiece. Prior art rotating saws mounted on flexible rotating cable drives are known to be dangerous to the hands and fingers of the user, due to the fact that the rotating blade can skip off of the workpiece and into the flesh of the hand holding the workpiece. This hazard is eliminated by the tool 70 of the invention.

We claim:

1. An oscillating saw tool including a motor housing, a tubular neck extending from the motor housing, and an oscillating drive housing joined to the tubular neck, said tubular neck being elongated so that said tool may be wielded by manually clenching and grasping said elongated tubular neck, a blade shaft extending from said oscillating drive housing and adapted to oscillate through a small angular excursion, an oscillating saw blade secured to said blade shaft, said saw blade comprising a thin planar member having a continuous peripheral edge extending thereabout, all of said continuous peripheral edge being exposed for cutting, said continuous peripheral edge of said saw blade including at least one linear edge portion for forming cuts having linear end terminations, and a plurality of cutting teeth extending from said at least one linear edge portion.

2. The oscillating saw tool of claim 1, wherein said motor housing, said tubular neck, and said oscillating drive housing are joined along a longitudinal tool axis, and said thin planar member is disposed in a plane extending generally perpendicularly to said longitudinal tool axis.

3. An oscillating saw tool including a motor housing, a tubular neck extending from the motor housing, and an oscillating drive housing joined to the tubular neck, said tubular neck being elongated so that said tool may be wielded by manually clenching and grasping said elongated tubular neck, a blade shaft extending from said oscillating drive housing and adapted to oscillate through a small angular excursion, an oscillating saw blade secured to said blade shaft, said saw blade comprising a thin planar member having a continuous peripheral edge extending thereabout, all of said continuous peripheral edge being exposed for cutting, wherein said continuous peripheral edge of said saw blade includes three linear edge portions arranged in a triangular relationship.

4. An oscillating saw tool including a motor housing, a tubular neck extending from the motor housing, and an oscillating drive housing joined to the tubular neck, said tubular neck being elongated so that said tool may be wielded by manually clenching and grasping said elongated tubular neck, a blade shaft extending from said oscillating drive housing and adapted to oscillate through a small angular excursion, an oscillating saw blade secured to said blade shaft, said saw blade comprising a thin planar member having a continuous peripheral edge extending thereabout, all of said continuous peripheral edge being exposed for cutting, wherein said continuous peripheral edge of said saw blade includes a teardrop shape having two linear edge portions extending from a common vertex to join opposed ends of an arcuate edge portion.

* * * * *